INVENTOR.
WOLFGANG BUERKNER
ATTORNEYS

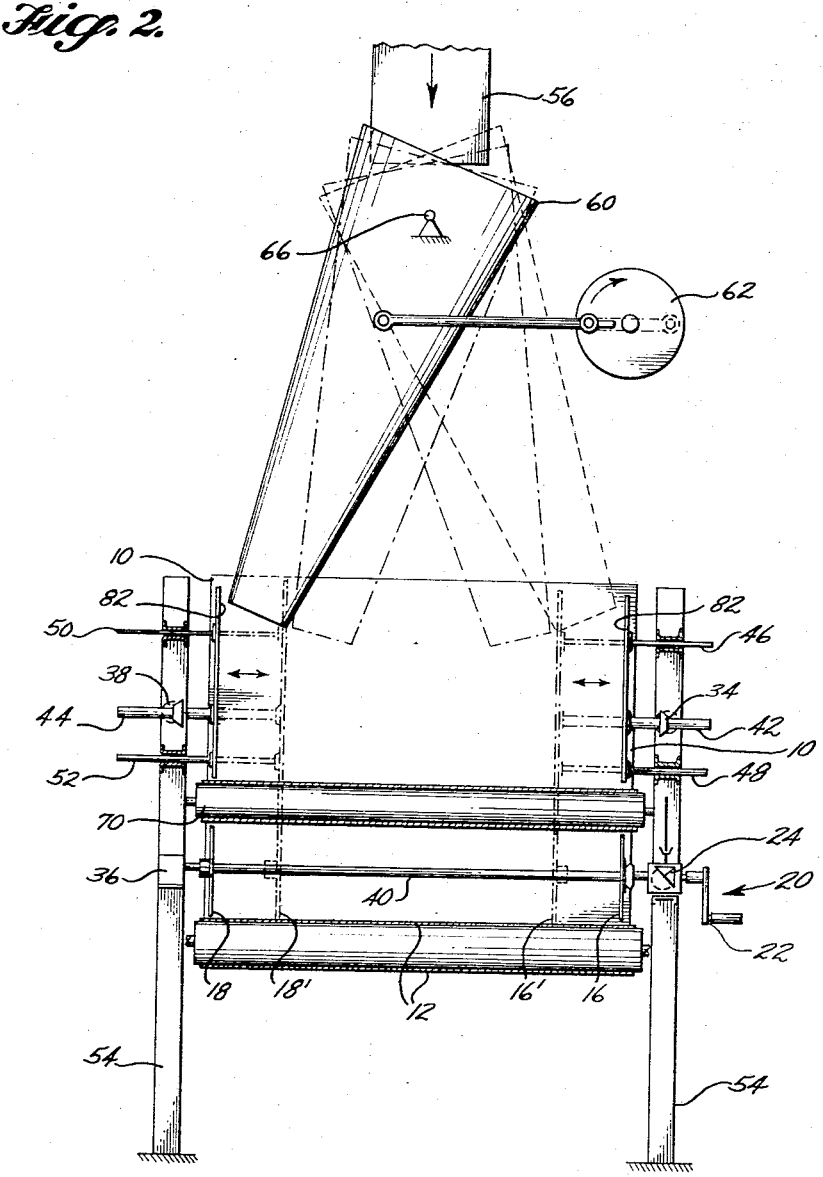

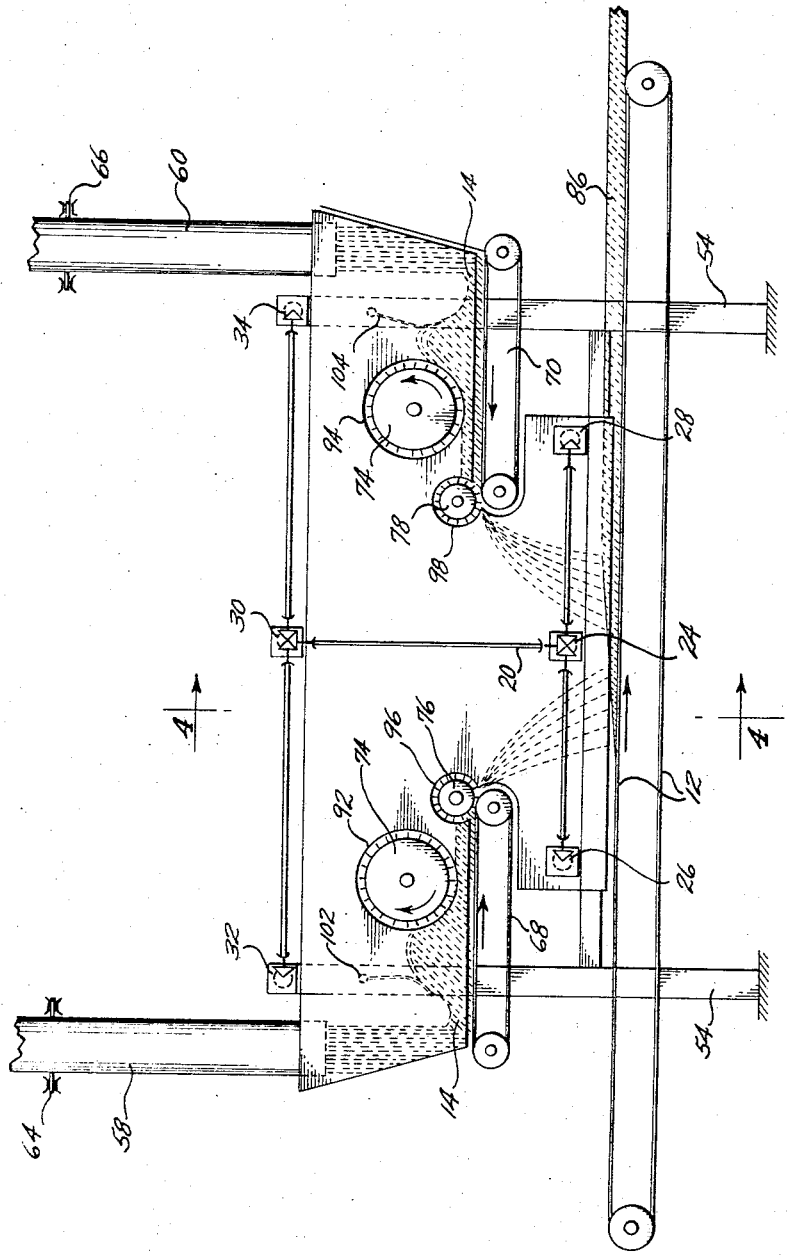

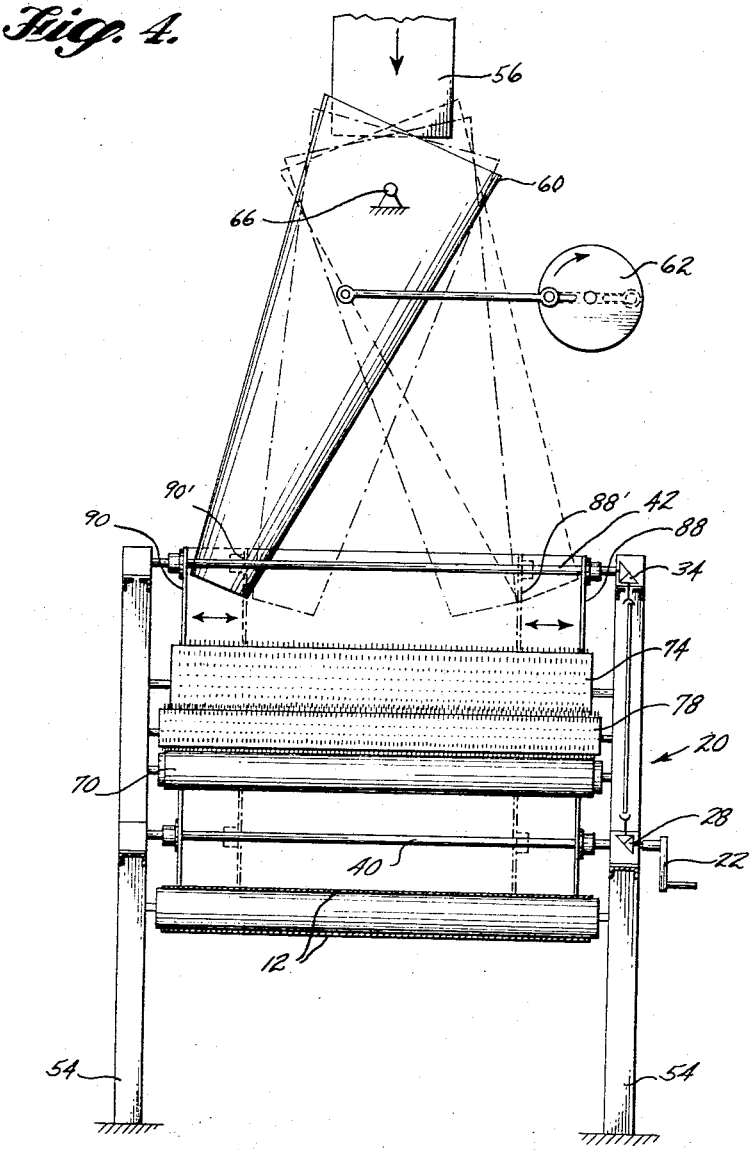

United States Patent Office 3,340,127
Patented Sept. 5, 1967

3,340,127
APPARATUS FOR MANUFACTURING FELTED MATERIALS
Wolfgang Buerkner, Darmstadt, Germany, assignor to Carl Schenck Maschinenfabrik G.m.b.H., Darmstadt, Germany, and Allwood, Inc., Glarus, Switzerland
Filed Jan. 29, 1962, Ser. No. 169,338
Claims priority, application Germany, Feb. 3, 1961, Sch 29,169
3 Claims. (Cl. 156—372)

The present invention relates to a means for producing felted mats of various widths and particularly relates to a means in which the felted material is deposited over the width of the mat only.

The particle board industry uses felters which produce a continuous particle mat on a base conventionally consisting of a continuous conveyor belt with or without supports and designed to make mats of predetermined size. The particles fed into the felter are carefully treated before being deposited on the base by mechanical or pneumatic felting. There the particle mat is formed of the felted layers of particles. The mat may be formed into a continuous band or into individual forms of fixed length and width. The latest type of equipment is designed mainly to produce continuous mats whose width may be varied without difficulty. Cut-off saws or other conventional tools are used to cut the mat to length. The continuous mat or its separate parts finally reach a station where the felted mat is condensed into a solid article. A press is conventionally used for that purpose.

The width is fixed by adjustable side walls which can be readily spaced farther apart or brought closer together by any conventional mechanism. This makes it possible to set the felting width on the base exactly as prescribed. In extreme cases, the mat may be felted across the entire width of the base. Thickness and length of the felted mat depend upon the shape of the finished particle board product. The aforementioned process obviously may be applied advantageously to felting mats other than those composed of wood particles or similar material.

The present invention concerns plant equipment, notably particle board equipment, designed to produce mats of various felted widths and which, therefore, has adjustable side walls. It is particularly characteristic of this invention that the particles within the set width of the mat are felted by devices whose spread can be adjusted to the width of the mat. This new equipment prevents the depositing of excess material which normally must be removed. Other characteristics of the invention may be noted from the description of the design examples and the claims. The examples cited refer mainly to felters employed in particle board production.

FIGURE 2 is a cross-sectional view taken along lines 2—2 of FIGURE 1.

FIGURE 3 is a diagrammatic side cross-sectional view of another form of the invented apparatus.

FIGURE 4 is a cross-sectional view taken along lines 4—4 of FIGURE 3.

Figure 1:
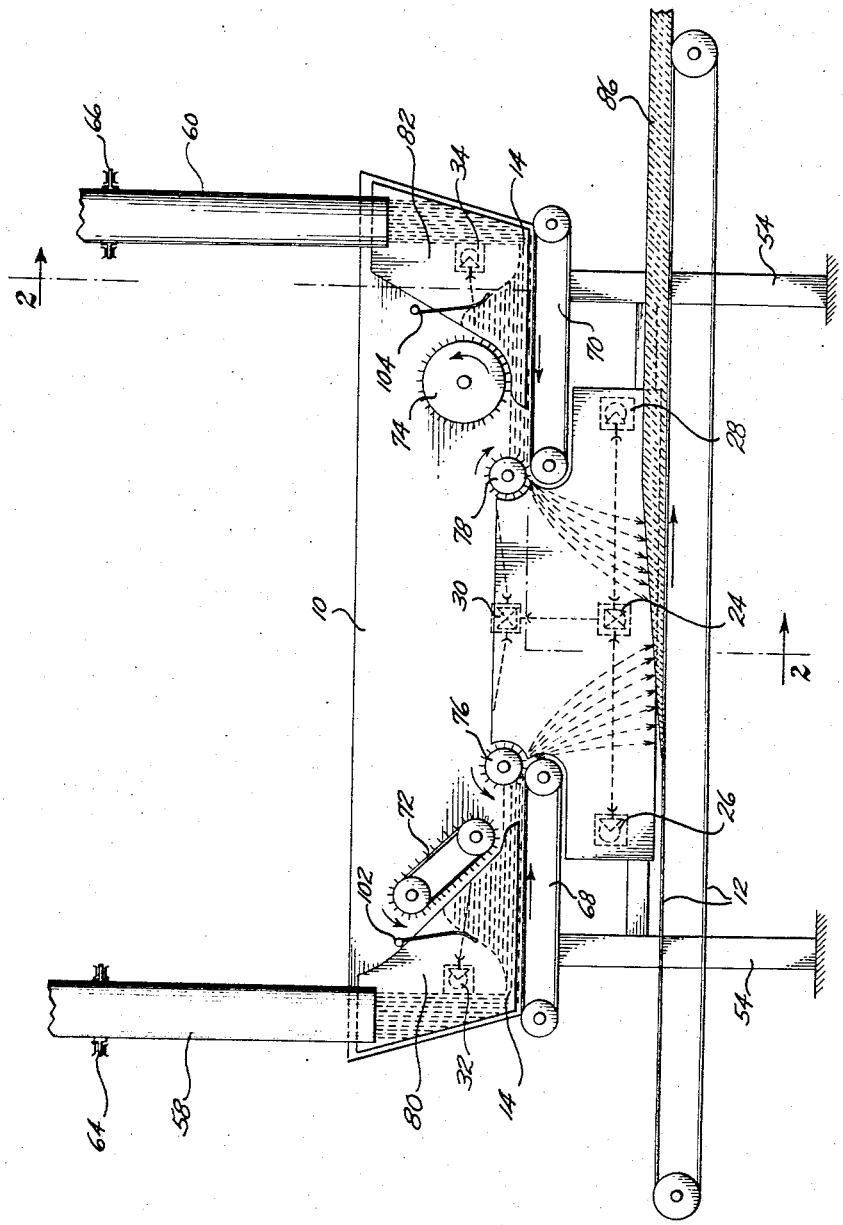
FIGURE 1 is a diagrammatic side cross-sectional view of a preferred form of apparatus.

A box-type frame 10 is mounted above the felting zone of mat base 12. The frame has the same width as mat base 12 and contains the equipment needed for preparing particles 14 for felting. Below that equipment are side walls 16 and 18. These are adjustably installed in the felting zone, on and above mat base 12 which may be in the form of a conveyor belt. As indicated in FIGURE 2, by the double headed arrow and by the innermost position of walls 16 and 18 shown in phantom at 16' and 18', the two walls may be spaced farther apart or closer together by any kind of mechanism such as a mechanism 20 having a crank handle 22, a number of bevel gears such as those illustrated at 24, 26, 28, 30, 32, 34, 36, and 38, drive and guide shafts such as those illustrated at 40, 42, and 44 and guide axles such as those illustrated at 46, 48, 50 and 52, subject to the described width of the mat to be felted. Number 54 marks the posts that support the equipment. Care must be exercised to set all adjustable wall parts so they will be uniform and set to exact measurements.

As shown in the example, the particles may be conveyed by ducts 56 from one or several storage bins (not shown in drawing), through ducts 58, 60 or similar conveyors, into frame 10. An adjustable crank drive 62, FIGURE 2, swings the duct attached to it on the pivot 64 or 66 above the respective felting zone in frame 10. The solid line duct and the dotted line duct represent the greatest, and the dashed line duct the smallest, swinging movements of the ducts, i.e., the maximum and minimum felting widths.

Between the ducts and the actual felting devices, there are feed belts 68 and 70, with leveling belt 72 and leveling roller 74, as well as cutting rollers 76 and 78 which prepare the particle mass for felting. The object and functions of these devices are well known in the industry.

The felting width in frame 10 is adjusted to conform with the prescribed mat width by means of the pairs of adjustable side walls. The side wall pair 80, one wall being shown, is on the right hand side of frame 10 in FIGURE 1, and the side wall pair 82 is on the left hand side of frame 10 in FIGURE 1. As shown in the drawing and previously described, mechanism 20 moves these latter walls inwardly and outwardly also.

Number 86 marks the felted mat on its base, conveyor belt 12. The mat 86 builds up to its maximum desired height by gradual deposition of the particles on the conveyor belt 12 as it moves under the stream of particles cascading successively from feed belts 68 and 70.

The equipment shown in FIGURES 3 and 4 has no frame 10. Side walls 88 and 90 in the felting zone on and above mat base 12 can be set by mechanism 20 according to the prescribed felting width. For that purpose, each of the side walls 88 and 90 has apertures 92, 94, 96 and 98 through which parts 74, 76 and 78 can slide when the walls are shifted. Sealers, such as rubber washers, etc., are provided where necessary. The remaining equipment parts of FIGURES 3 and 4 are the same as those of FIGURES 1 and 2, and are identified by identical numbers to those shown in FIGURES 1 and 2.

The build up of particles 14 behind leveling belt 72 or roller 76 will cause a deflection of baffles 102 or 104 and this deflection will indicate the amount of material on the feed belts 68 or 70. This deflection may be used to increase or decrease the volume of particles 14 being fed to the feed belts by a visual, mechanical, photoelectric, or electronic linkage between the baffles 102 and 104 and valves in the feed ducts.

While specific details or preferred embodiments have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. Apparatus for producing felted mats from particle material, comprising particle supply means having a downwardly extending and pivotally mounted feeder duct and drive means connected to said duct for imparting a swinging movement thereto, a base conveyor forming a horizontal top surface beneath said duct for supporting the mat to be formed, a device for preparing particle material for felting, said device being interposed between the lower end of said feeder duct and said base conveyor and having an auxiliary conveyor forming a surface for receiving the particle material from said duct during swinging movement of the latter, said device having spreader means for distributing prepared material onto said base conveyor, said two conveyor surfaces having parallel advancing directions and said duct having a stroke transverse of said direction, each of said two conveyors having two lateral confining wall members extending parallel to said direction and being transversely spaced from each other along each of said conveyor surfaces, means for varying the mutual spacing of said wall structures of each of said two conveyors to adapt the active width of said auxiliary conveyor to the adjusted mat width on said base conveyor, and means for varying the stroke width of said feeder duct for also adapting it to said mat width.

2. Apparatus for producing felted mats according to claim 1, comprising a control mechanism drivingly connected with said wall structures of said auxiliary conveyor and with said wall structures of said base conveyor for conjointly displacing said structures.

3. In apparatus for producing felted mats according to claim 1, said device comprising rotatable means engageable with the particle material on said auxiliary conveyor for preparing said material for felting, said rotatable means having an axis of rotation transverse of said conveyor advancing direction, and said respective wall structures of said auxiliary conveyor having respective apertures traversed by said rotatable means to permit displacement of said wall structures axially along said rotatable means.

References Cited

UNITED STATES PATENTS

| | | | |
|---|---|---|---|
| 2,737,997 | 3/1956 | Himmelheber et al. | 156—373 X |
| 2,925,117 | 2/1960 | Moore et al. | 156—377 X |
| 3,057,022 | 10/1962 | Bar et al. | 156—369 X |
| 3,158,668 | 11/1964 | Johnson | 156—82.4 X |

EARL M. BERGERT, *Primary Examiner.*

P. R. WYLIE, J. F. MATTHEWS, W. E. HOAG,
*Assistant Examiners.*